United States Patent [19]

Pacheco et al.

[11] Patent Number: 5,376,273

[45] Date of Patent: Dec. 27, 1994

[54] SUPPORTED MICROPOROUS MEMBRANE

[75] Inventors: Manuel M. Pacheco; John F. Pacheco, both of Billerica, Mass.

[73] Assignee: Costar Corporation, Cambridge, Mass.

[21] Appl. No.: 82,308

[22] Filed: Jun. 25, 1993

Related U.S. Application Data

[63] Continuation of Ser. No. 884,832, May 18, 1992, abandoned.

[51] Int. Cl.⁵ .............................................. B01D 29/00
[52] U.S. Cl. ............................... 210/490; 210/500.42; 210/489; 210/506
[58] Field of Search ................ 210/490, 500.42, 489, 210/504, 505, 506, 500.1, 491; 264/45.1, 41; 428/304.4; 55/16

[56] References Cited

U.S. PATENT DOCUMENTS

| | | | |
|---|---|---|---|
| 3,568,889 | 2/1971 | Cooper et al. | 210/490 |
| 3,676,193 | 7/1972 | Cooper, IV et al. | 210/490 |
| 4,203,848 | 5/1980 | Gandine, II | 210/500.42 |
| 4,645,602 | 2/1987 | Barnes, Jr. et al. | 210/490 |
| 4,824,568 | 4/1989 | Allegrezza, Jr. et al. | 210/500.42 |
| 4,990,294 | 2/1991 | Yen et al. | 264/41 |
| 5,013,339 | 5/1991 | Mahoney et al. | 55/158 |
| 5,017,292 | 5/1991 | DiLeo et al. | 210/500.42 |
| 5,032,274 | 7/1991 | Yen et al. | 210/500 |
| 5,057,600 | 10/1991 | Beck et al. | 528/480 |
| 5,096,637 | 3/1992 | DiLeo et al. | 264/45 |

Primary Examiner—Robert A. Dawson
Assistant Examiner—Ana M. Fortuna
Attorney, Agent, or Firm—Wolf, Greenfield & Sacks

[57] ABSTRACT

Microporous membranes having supporting structures are disclosed. A microporous filtration membrane made of a polymeric material has an integral support, both the support and the membrane having substantially identical chemical composition. Preferred supported membranes of the present invention are made of polyvinylidene fluoride. At least part of the support is bonded to the surrounding microporous membrane to provide rigidity and chemical inertness. Methods of forming the supported microporous membranes are described, including a method that results in microporous membranes having unique structural and functional characteristics.

24 Claims, 4 Drawing Sheets

SUPPORTED MICROPOROUS MEMBRANE

This application is a continuation of application Ser. No. 07/884,832. filed May 18, 1992, now abandoned.

FIELD OF THE INVENTION

This invention pertains to microporous membranes having supporting structures formed integrally with the membrane itself.

BACKGROUND OF THE INVENTION

Conventional microporous membranes made from polymers (e.g. polycarbonate, polysulfones and polyvinylidene fluoride) are used to filter a wide variety of liquids and gases. Many polymeric membranes by themselves, however, have relatively poor mechanical properties. These membranes are fairly weak and may not maintain their integrity under normal handling. They will stretch when pulled and will shrink upon heating. They are also sensitive to folding and may crack at pleats that develop when folded. Furthermore, the mechanical assembly of unsupported polymeric membranes in devices frequently requires a thermoplastic component in order to seal the membrane at a seam or cap.

Where polymeric membranes are, however, structurally supported, the membranes typically are formed with an external, disposable mesh. This adds cost to the entire process and requires the additional step of removing the used membrane from the disposable mesh.

Another type of support is one in which a non-disposable, external support such as a polypropylene scrim or grid is laminated to the membrane.

Polymeric membranes are also made with internal supporting systems. In one membrane of this type, a nonwoven grid is incorporated into the polymer internally as the polymeric membrane is made. The grid and membrane are made of different materials. Nevertheless, polymeric membranes with internal supporting systems made of different materials can overcome only some of the problems associated with unsupported membranes. A serious problem encountered during production and use of supported membranes is that, under certain conditions, the external or internal grid can delaminate from the membrane. Because the materials of the grid and surrounding membrane are different, the thermal properties of the unit as a whole is poor because the grid and membrane have different rates of thermal expansion and contraction.

SUMMARY OF THE INVENTION

Supported microporous filtration membranes are described in which the membrane includes a polymer and the support includes the same polymer. Moreover, at least part of the support is embedded in, and bonded to, the microporous membrane to provide structural rigidity, chemical inertness and uniformity of thermal expansion and contraction.

In one embodiment, microporous polyvinylidene fluoride (PVDF) membranes of defined thickness and having opposed surfaces are described in which the membrane is bound to at least a portion of a support that is also made of PVDF. In a particularly preferred embodiment, microporous PVDF membranes of defined thickness and having opposed surfaces are described in which the membrane is bonded to at least a portion of a support that is a grid of PVDF filaments. "Bonding" involves chemical and/or physical interlinkage of the PVDF support with the adjacent PVDF microporous membrane.

The support can be positioned between opposed surfaces of the microporous membrane so that the PVDF membrane is bonded to the PVDF support.

The support can also be positioned to be partially exposed above at least one surface of the membrane. In a preferred embodiment, the partially-exposed grid defines a plurality of mesh-like openings on the surface of the membrane.

One unique aspect of the preferred supported PVDF membranes of this invention is that the membrane has a unique microstructure defined by a plurality of globular or spherical bodies attached to one another. Moreover, the membrane has a unique macrostructure. In one embodiment, the macrostructure is defined by a plurality of spheroidal craters with an average diameter substantially greater than the nominal pore size of the membrane. In another embodiment, the macrostructure is defined by a plurality of flattened nodules covering substantially the entire surface of the membrane.

The invention also describes a solvent-casting method for making supported microporous polymeric membranes. The method includes providing a solution containing a polymer dissolved in a solvent and contacting the dissolved power as a thin film onto a polymeric support such as, for example, a filamentous grid. The support includes a polymer that is the same as the polymer that will form the membrane. The polymeric components of the support are partially dissolved by the solvent. The polymeric thin film and support are then immersed in at least one formation bath containing a nonsolvent for the polymer. A microporous membrane is formed as the nonsolvent of the formation bath gradually replaces the solvent. Conditions are provided in the formation bath sufficient for formation of a microporous membrane having a support and membrane that are mutually bonded to each other. In preferred embodiments of the invention, both the polymer and the support are PVDF homopolymers.

In particularly preferred embodiments of the invention, the method comprises providing a solution including a PVDF polymer dissolved in a solvent:co-solvent system as a thin film to a filamentous grid and then providing a formation bath including a nonsolvent for the PVDF polymer as well as at least one co-solvent. This solvent:co-solvent system allows formation of preferred supported PVDF microporous membranes that have unique structural and functional properties.

The integrally supported membrane that results from the process of the invention obviates many of the negative features of conventional supported membranes. The chemical purity of the integrally-supported membrane is not compromised by foreign (i.e. non-support and/or non-membrane) components. The membrane will not delaminate since the thermal expansion and contraction of both the support and the microporous membrane are identical. The membrane with its support is much stronger than nonsupported membranes and has increased capacity for folding and pleating without cracking at the folds. The membrane and integrally-bonded support are equally resistant to chemicals; thus chemical resistance is not limited by non-support and/or non-membrane components.

DETAILED DESCRIPTION OF THE INVENTION

The present invention provides for a microporous polymeric membrane, the membrane internally or externally supported by its own polymeric support. A unique characteristic of the supported microporous membrane of the invention is that the microporous membrane and the support include the same polymer. The term "include" refers to a range of values between about 40% to 100%. That is, between about 40% and 100% of the constituents that make up the support and membrane will be the same polymer. Applicants have discovered that dissolution of the polymer of the microporous membrane and of the support can facilitate bonding of the membrane and support to each other to provide for a membrane that is stronger and less susceptible to delamination than conventional supported microporous membranes.

The term "microporous membrane" means a membrane, primarily used for filtration, that consists of a matrix of interconnected material, in which the material defines a sponge-like structure having millions of interconnected flow channels having a width defined within narrow limits (i.e. a pore size). Without wishing to be bound by any theory, it is believed that the support and membrane are bonded by mutual chemical and/or physical interlinkages between the polymer of the support and the polymer of the attached microporous membrane. These interlinkages can be achieved through molecular bonding including ionic and covalent bonds, as well as mutual physical interlinkage between the polymer components of support and microporous membrane. This important aspect of the present invention will greatly add to the strength of the membrane, as discussed in more detail below.

In preferred embodiments of the present invention, the membrane and support include polymeric material consisting of pure polyvinylidene fluoride (hereinafter "PVDF"). The term "pure" is meant to refer to homopolymers; that is, polymers that only contain repeating units of vinylidene fluoride. In the most preferred embodiments, the membrane and support are composed entirely of homopolymeric PVDF.

The bonded support itself is preferably porous. The term "porous" is meant to encompass a variety of structures of opposed surfaces and defined thickness having one or more openings, apertures or passageways extending from one surface to another across the thickness. The actual number, size, and shape of the openings is not meant to be limiting. The term "porous" thus includes woven materials in a grid or mesh-like configuration as well as porous, nonwoven materials formed by extrusion, lamination and the like.

Figure 1:
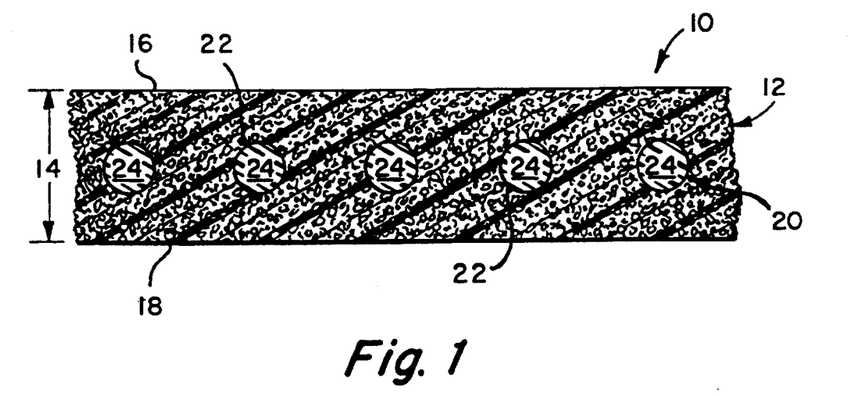
FIG. 1 is a schematic illustration of an embodiment of the present invention.

For example, FIG. 1 is a schematic cross-sectional illustration of one embodiment of the present supported membrane. The supported membrane 10 includes a microporous filtration membrane 12 including a polymer, which membrane has a defined thickness 14 and two opposed surfaces 16,18. The porous support is a grid of filaments 20 embedded between the opposed surfaces 16,18, thereby forming an internal support. The grid 20 includes the same polymer and is bonded to the microporous membrane 12, particularly at the interface 22 between the outer peripheral surfaces 23 of individual filaments 24 of the grid and the surrounding microporous membrane 12. Although individual filaments 24 are spherical, other shaped filaments can be used (i.e. square, rectangular, oval) without departing from the scope of the invention.

It will be understood that bonding can also occur between a membrane and a support that is attached to either one or both of the external, opposed surfaces of the membrane.

Figure 2:
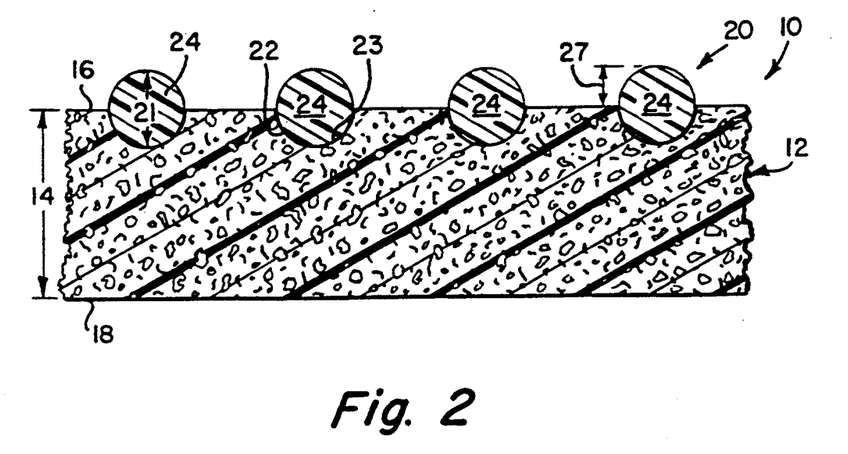
FIG. 2 is a schematic illustration of a second embodiment of the present invention.

FIG. 2 is a schematic cross sectional illustration of preferred embodiment of this type. The reference numbers in this figure are identical to those in previous FIG. 1 for ease of identification, except where noted. The supported membrane 10 includes a microporous filtration membrane 12 that has a defined thickness 14 and two opposed surfaces 16,18. The membrane includes a polymeric material. The support is a grid 20 of filaments partially bonded to surface 16. Each filament 24 has a defined thickness 21 The grid 20 includes the same polymer and is bonded to at least surface 16 of the microporous membrane 12, at the interface 22 between the outer periphery 23 of individual filaments 24 of the grid and the surrounding membrane. Because only part of grid 20 is bonded, a portion 27 of the individual filaments 24 is exposed above surface 16. This partial exposure above surface 16, defines a plurality of mesh-like openings on surface 16.

The portion of filament 27 thus exposed can vary from about 25% to about 50% of the total thickness 21. In embodiments of the invention where the filaments are about 2 mil thick, preferably one half of the filament thickness is exposed; where the filament thickness is about 5 ml, about one-quarter of the filament thickness is exposed.

Partially-exposed supported membranes have significant advantages as compared to conventional membranes, whether supported or nonsupported. In conventional procedures for liquid filtration, a spacer is often required on the side of the membrane from which the filtrate or effluent is released. Without such a spacer, the effluent tends to pool or accumulate at the surface from which it is being released and often cannot physically be released from the surface of the membrane. Partially-exposed supported membranes, as exemplified in FIG. 2, provide a distinct advantage because such spacers or screens are not required. The distance 27 provided by the exposed portion of the filament and the mesh-like structure of the grid thereby imposed on surface 16 of the membrane, acts as an integral spacer. Filtration apparatus can be fabricated that have fewer parts and are much simpler to operate. It will also be appreciated that a partially-exposed support can also be a nonwoven structure that is porous enough to allow effluent to be released from the surface of the membrane.

Figure 3:
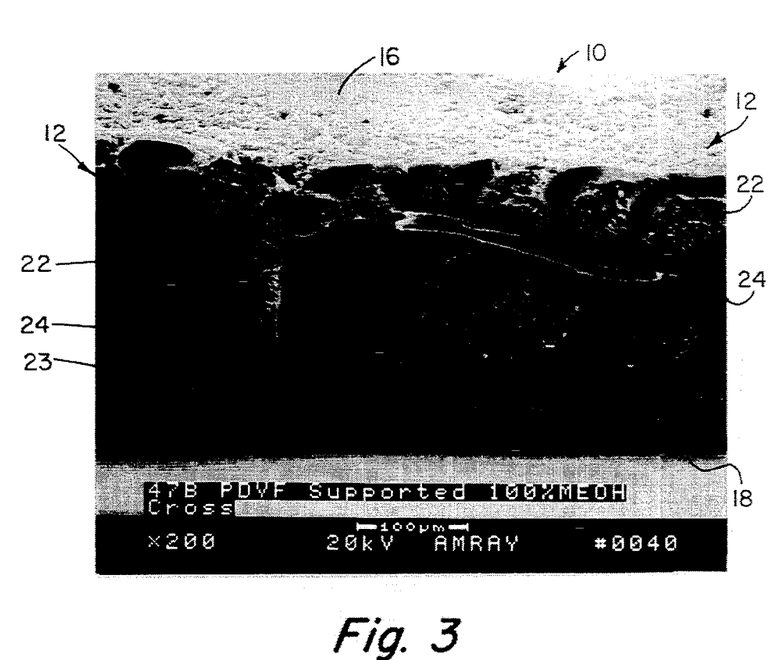
FIG. 3 is a scanning electron micrograph of one embodiment of the invention in cross section.

FIG. 3 is a scanning electron micrograph of the embodiment of FIG. 1 in cross section. The reference numbers in this figure are identical to those in previous FIG. 1 for ease of identification. A plurality of PVDF filaments 24 is embedded within, and bonded to, a surrounding matrix 12 of microporous PVDF membrane.

The individual components of this invention and the processes for producing the invention are now described in more detail.

A. Microporous Membrane

The microporous membranes of the present invention can include a variety of polymers, provided that the polymers can be bonded to at least some portion of a polymeric support. For example, U.S. Pat. No. 3,100,721 describes unsupported microporous membranes made of a wide spectrum of polymers including: nylons, polyesters, vinyl polymers and copolymers and the like. Other materials that can be used to form supported microporous membranes of the present invention include polysulfones and polycarbonates.

Preferred microporous membranes include homopolymers of vinylidene fluoride. The most preferred supported membranes are 100% polyvinylidene fluoride homopolymer.

The present invention encompasses a family of supported microporous PVDF membranes having nominal pore sizes ranging from about 0.02 microns to about 2.0 microns. The term "nominal pore size" refers to the minimum size of particles that will be retained on the membrane. Thus, a membrane with a nominal pore size of about 0.45 microns means that particles greater than about 0.45 microns will be retained on the membrane, those less than about 0.45 microns will pass through and will not be retained.

Preferred microporous PVDF membranes of the present invention possess unique structural and functional properties not found in conventional PVDF membranes. These properties, and the methods for producing PVDF membranes having these properties, are detailed in co-pending application Ser. No. 07/879,200, entitled "PVDF Microporous Membrane and Method" (hereinafter "PVDF Membrane"), the entire contents of which are incorporated herein by reference.

The functional properties of these preferred membranes differ significantly from those of conventional PVDF microporous membranes. Specifically, preferred membranes of the invention have greater liquid flow rates per unit area with equal particle retention as compared to conventionally-made membranes of the same pore size and thickness. This means that if a sample of a solution containing particles is passed through the membrane of the present invention and an equal volume sample of the same solution is passed through a conventional membrane, both membranes will retain the same amount of material, but the membrane of the present invention will have a faster flow rate and process the liquid volume in a shorter time period. Moreover, compared to conventionally-made PVDF membranes, the preferred PVDF membranes have an increased surface area available at the point of contact between a molecule and the surface of the membrane. This means that a sorbed molecule is more strongly held to the surface of present PVDF membranes. This is an advantage in, for example, immunodiagnostic applications where smaller amounts of expensive molecules such as labelled reagents and tracers can be used with less wastage. These functional advantages are a direct result of the unique structural characteristics of the membranes of the present invention.

Figure 4:
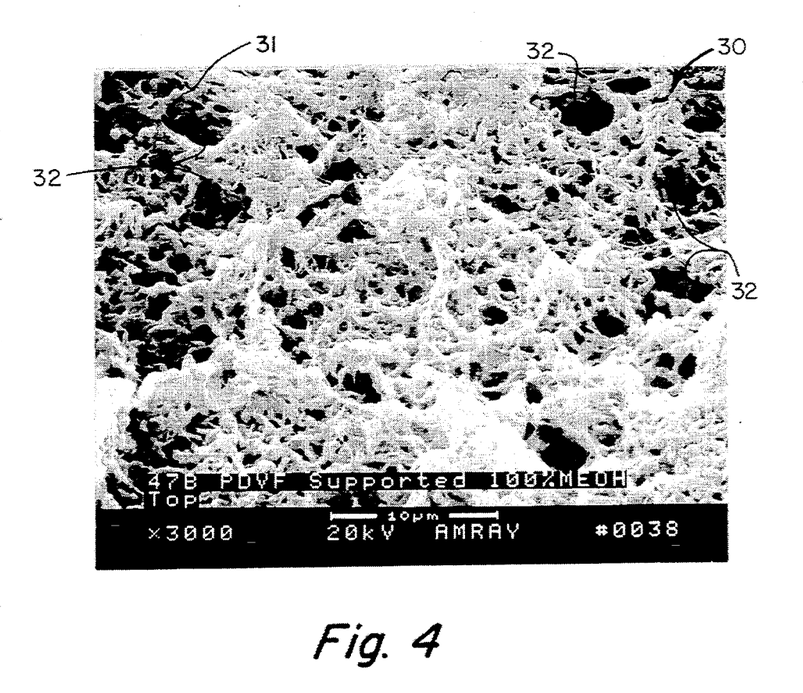
FIG. 4 is a scanning electron micrograph of the top surface of the embodiment of FIG. 3, formed according to Example 1.

Referring to FIG. 4, the top surface 30 is shown of a particularly preferred microporous PVDF membrane of the invention having a nominal pore size of 0.45 microns.

The top surface 30 shows a much more rounded aspect in the present membrane than does the top surface of conventional membranes (see "PVDF Membrane", co-pending application Ser. No. 07/879,200). The microstructural morphology of the present membrane appears as a plurality of globular bodies 31 attached to one another.

The membrane also has a unique macrostructure. The term "macrostructure" refers to morphological features of the membrane that have dimensions substantially greater than the average pore size. FIG. 4 illustrates one particular macrostructure; namely that the top surface morphology of the present PVDF membrane takes on a cratered or pocked aspect, in which the top surface morphology is arranged in roughly spheroidal, cratered constructions 32 having a scale size of the order of about 3-4 microns.

As discussed below, supported microporous membranes of the present invention are formed on solid substrates in one or more solvent-containing formation baths. As used herein, the term "top surface" refers to that surface of the microporous membrane that is not engaged with the solid substrate. Conversely, the term "bottom surface" as used herein refers to that surface of the microporous membrane that is engaged with the solid substrate during formation.

Without wishing to be bound by any particular theory, it is believed that the particular macrostructural morphology of FIG. 4 is due to the orientation of the PVDF molecule as the membrane is being formed in a process of the invention. Conventional membranes are believed to contain fluorine atoms as part of the PVDF molecules that are not ordered in any defined manner but are randomly dispersed in several directions. In contrast, the preferred process of the present invention is believed to orient the bulk of the fluorine atoms of the PVDF molecules toward the outer surfaces (i.e. both top and bottom) of the forming membrane.

Furthermore, it is believed that the surface orientation of the PVDF molecules results in a unique configuration of the middle of the membrane, which has a lower concentration of PVDF per unit membrane as compared to the surface regions as the membrane is being formed. This means that less mass of PVDF is available to be converted during membrane formation into a matrix of intercommunicating flow channels. Consequently, the middle portion of the membrane has a straighter, less tortuous flow path.

Another unique aspect of the macrostructure of the preferred membrane is an increased area available on the membrane surface. This is particularly advantageous in applications requiring transfer of one or more molecules to the membrane, since there is a greatly enhanced membrane surface area at the point of contact between a molecule resting on the surface of the PVDF membrane and the membrane itself. Because the surface area of PVDF polymer is high at the point of contact between a molecule and the surface of the present membranes it is believed that sorption of a molecule onto the surface of the present membrane from a target surface or another substrate will be enhanced.

Figure 5:
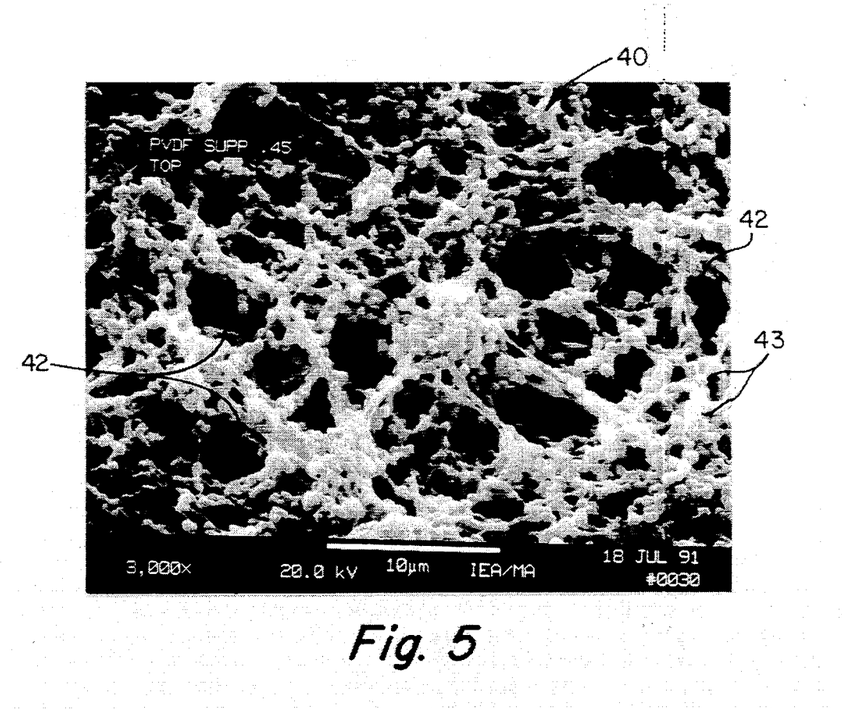
FIG. 5 is a scanning electron micrograph of the top surface of a 0.45 micron pore size PVDF membrane of the present invention.
Figure 6:
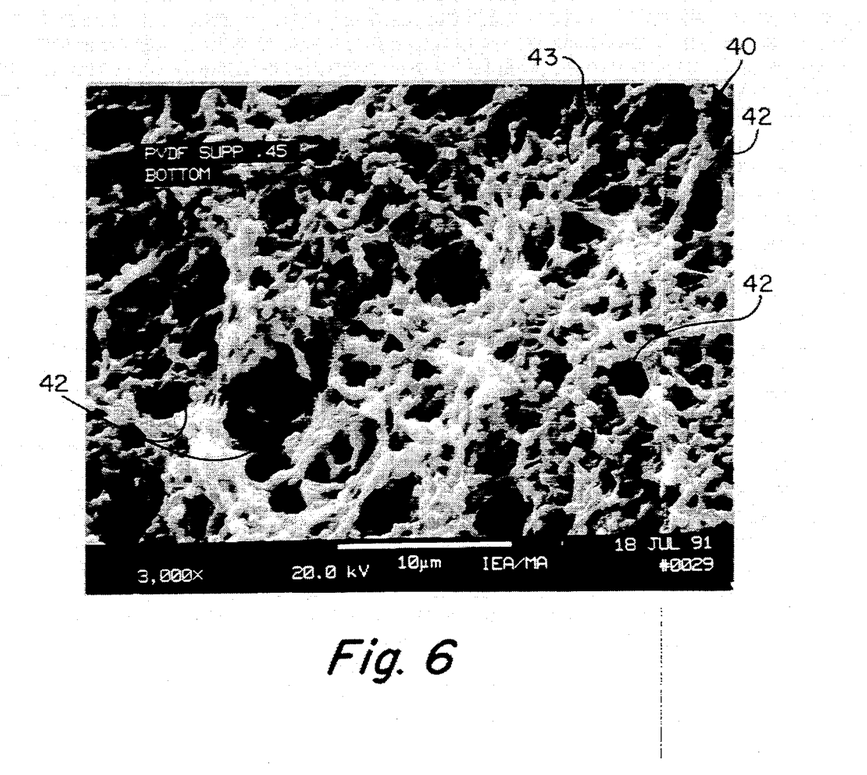
FIG. 6 is a scanning electron micrograph of the bottom surface of a 0.45 micron pore size PVDF membrane of the present invention.

FIGS. 5 and 6 show the top and bottom surface morphology, respectively, of a 0.45 micron pore size supported PVDF membrane 40. A series of features 42 on both the top and bottom surfaces can clearly be seen in these photographs that are about 3 to 4 microns wide and substantially conform to a cratered, spherical shape. The diameter of these craters 42 is substantially greater than the nominal pore size of 0.45 microns. Further, the microstructure of the membrane can be seen as a plurality of spheroidal or globular bodies 43 attached to each other.

Figure 7:
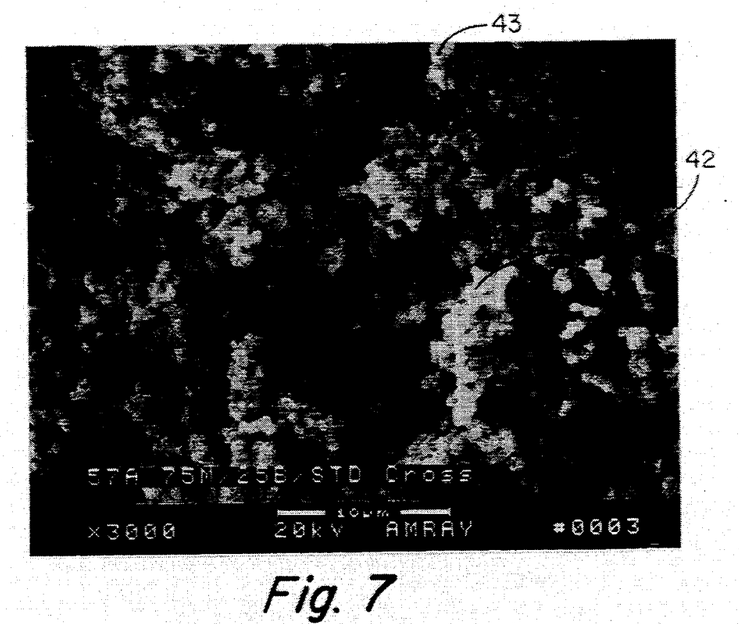
FIG. 7 is a scanning electron micrograph of the vertical cross-section of a membrane of the present invention.

The cratered macrostructure 42 and spheroidal microstructure 43 of FIGS. 5 and 6 is also repeated throughout the vertical cross-section (i.e., thickness of the preferred membranes of this invention as shown in FIG. 7.

Figure 8:
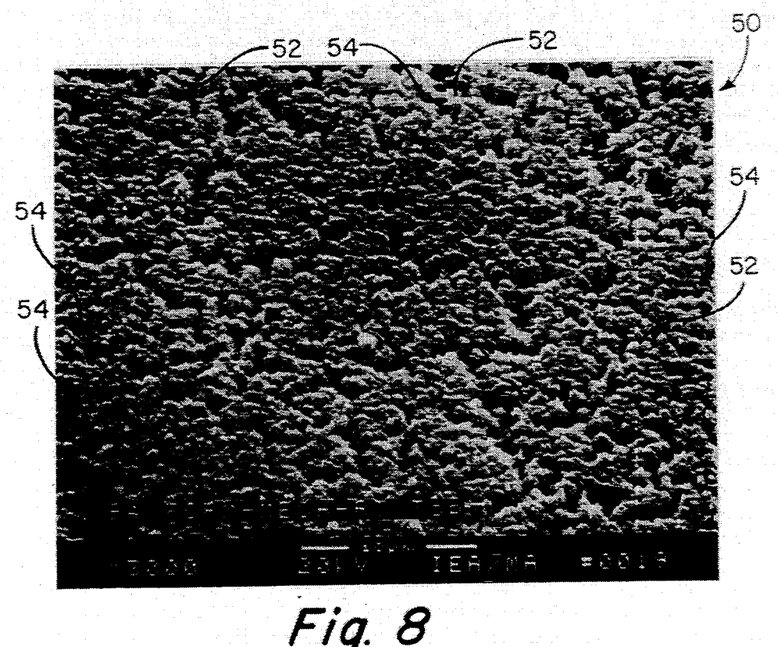
FIG. 8 is a scanning electron micrograph of another surface morphology of the present invention.

FIG. 8, illustrates yet another unique macrostructural morphology of the preferred PVDF membranes. The surface 50 of this particular membrane includes a series of flattened, spherical nodules 52 that are of substantially equal diameter and cover substantially the entire surface of the membrane. This particular embodiment, the nominal pore size 54 is about 0.1 microns and the average diameter of these flattened, spherical nodules is less than 1 micron and can range down to several tenths of microns in diameter.

Table I, reproduced below from "PVDF Membrane", co-pending application Ser. No. 07/879,200, summarizes the nominal pore size, methanol bubble points and water flow rates of the preferred PVDF membranes as compared to conventional PVDF membranes. For a given nominal pore size, the PVDF membranes of the present invention has a water flow rate that is at least 30% greater than the water flow rate of conventional PVDF membranes having identical nominal pore size and thickness.

TABLE I

Comparison of Preferred Microporous PVDF Membrane With Conventionally Produced Microporous PVDF Membranes

| Nominal Pore Size (microns) | Methanol Bubble Point (psi) | | Water Flow Rate (ml/min/cm$^2$) | |
| --- | --- | --- | --- | --- |
| | Present Invention | Millipore ® | Present Invention | Millipore ® |
| 5.0 | — | 2–3 | — | 161 |
| 2.0 | 1.5–2 | — | 125–190 | — |
| 0.65 | 6–8 | 6–7 | 40–50 | 38 |
| 0.45 | 10–12 | 8–10 | 20–26 | 16 |
| 0.22 | 18–21 | 17–21 | 8–10 | 6.5 |
| 0.10 | 28–32 | 28–31 | 3.6–4 | 2.9 |
| 0.05 | 40–45 | — | 1.5–2.0 | — |
| 0.02 | 50–60 | — | 0.50–0.65 | — |

B. Polymeric Support

The support of the present invention includes the same polymer as the microporous membrane. Furthermore, the support has the additional property that it is bonded to the microporous membrane by interlinkages between the corresponding polymer portions of the support and membrane. Particularly preferred supports are a grid of filaments made entirely of pure PVDF homopolymer, between about 2 to 5 mils in thickness. The grid pattern can vary over a wide range but preferred patterns are in the order of 40×40 to 60×40 strands per inch. These PVDF filaments can be made by conventional processes and are commercially available (Lumite Corporation, Gainesville, Ga.).

Other supports are nonwoven, porous and substantially planar PVDF structures that can be co-extensive in size with a surface of the PVDF membrane.

C. Forming the Support-Membrane System

A variety of methods, not intended to limit the scope of the invention, can be used to form the supported microporous membranes of the present invention. Conditions are chosen such that the solvent used to dissolve the polymer that makes up the final microporous membrane is allowed to contact the support so that the polymeric portion of the support itself will be partially dissolved by the solvent. During formation of the microporous membrane, it is believed that this partial dissolution of the support will aid in forming a chemical and/or physical interlinkage between the support and the immediately adjacent microporous membrane structure.

Solvent-casting methods for making microporous membranes are well-known. See, for example, U.S. Pat. No. 3,100,721 which describes a technique for making a variety of microporous membranes. Generally, the method includes providing a thin film of solution to a support. The solution includes a first polymer dissolved in a solvent. The support includes the first polymer as well and is preferably disposed on an inert substrate. The support is exposed to solvent under conditions sufficient for part of the support to dissolve. The thin polymeric film, support and inert substrate are immersed in at least one formation bath containing at least a nonsolvent for the polymer. A microporous membrane is formed in the formation bath to provide a formed polymeric microporous membrane having a support bonded to a part of the membrane. The conditions under which this membrane can be formed can easily be determined by those of ordinary skill in the art by preparing solvent-cast membranes under a variety of conditions and testing the strength of the bonding using procedures outlined below.

A continuous solvent-casting method for producing PVDF microporous membranes can be found in U.S. Pat. No. 4,203,848 (Grandine II, issued May 20, 1980). Nevertheless, it will be appreciated that, without departing from the scope or intent of the present invention, microporous, polymeric membranes made of other materials besides PVDF can also be formed and bonded to supports that include the same polymer as the membrane. These polymeric materials, described previously, include: nylons, polyesters, vinyl polymers and copolymers, and the like.

A method for producing partially exposed supported membranes uses the same continuous casting method. The degree of exposure of the support is determined primarily by adjusting the contact time between the dissolved polymer and the support. The speed of the moving support and substrate needed to produce a partially-exposed membrane is a minimum of about 10 feet per minute. The rate of coating of the support is primarily determined by the flow rate from the polymer reservoir, which design can be easily adjusted and determined by those of ordinary skill in the art. Generally, however, it will be appreciated that the thinner the polymer coating (e.g. the faster the contact time/substrate speed), the more support will be exposed. Conversely, if the rate of coating is increased, or the support is coated with polymer on both of its sides simultaneously, the support will be only slightly exposed, or completely encased within the PVDF polymeric material. These variables can be easily adjusted by those of ordinary skill in the art.

The particularly preferred continuous method for making a preferred supported microporous PVDF membrane generally includes the steps of providing a solvent:co-solvent solution that is capable of dissolving PVDF and providing a formation bath which includes a nonsolvent for the PVDF (e.g. methanol) and a portion of the co-solvent. A support (e.g. a grid) of PVDF supported on a moving substrate is placed in contact with the dissolved polymer solution and then the polymer is deposited as a thin layer on the grid and substrate. The combined polymeric thin film, grid, and substrate are immersed in at least one formation bath.

The term "co-solvent" refers to organic solvents that dissolve PVDF resin slowly at most temperatures. Because of this, by themselves, many co-solvents are generally unsuitable for the methods of the present invention. They are often unsuitable for the additional reason that they tend to break down PVDF polymer, albeit slowly, to such an extent that the PVDF cannot reform or coagulate again in a conventional solvent-casting process.

This property of a co-solvent, surprisingly, can be utilized in the preferred method of the present invention. A small amount of co-solvent can break down enough of the PVDF polymer so that the solvent can continue to attack the PVDF in the formation bath over a wide range of formation bath temperatures; even including formation bath temperatures near zero degrees Celsius.

Co-solvents can include formamide, methyl isobutyl ketone, cyclohexanone, diacetone alcohol, diisobutyl ketone, ethylacetoacetate, triethyl phosphate, propylene carbonate, glycol ethers and glycol ether esters. A particularly preferred co-solvent is n-butylacetate.

The term "solvent" refers to organic compounds that dissolve PVDF resin rapidly at most temperatures. Solvents used in the preferred method can form PVDF solutions containing at least 25% by weight of PVDF.

A preferred solvent of the present invention is N-methyl-2-pyrrolidone (hereinafter "N-pyrrol") although other solvents such as dimethyl formamide, can be used.

The initial dissolution of PVDF is preferably done in a solvent:co-solvent system wherein the components are miscible with each other. In preferred embodiments, the solvent is about 95% N-pyrrol, the balance being one or more selected co-solvents.

At least about 50% of the formation bath is a nonsolvent that is always miscible with the other components. The term "nonsolvent" refers to organic compounds that do not dissolve PVDF. A portion of the same co-solvent that is in the initial PVDF dissolution mixture is also preferably included. The preferred nonsolvent for use in the formation bath is methanol. Other alkanolic nonsolvents can be used such as ethanol and butanol provided that the nonsolvent liquid is miscible with the other components in the formation bath.

Formation of a microporous PVDF membrane occurs in one or more formation baths by gradual replacement of the solvent and co-solvent with the nonsolvent of the formation bath, as described in "PVDF Membrane", co-pending application Ser. No. 07/779,200. The presence of at least some solvent and/or co-solvent in the formation bath will also contribute to slight dissolution of the PVDF support (e.g. grid) and bonding of the PVDF grid to the formed microporous PVDF membrane. Thus, as the support remains in the formation bath, the support becomes coated and integrally bonded with a PVDF microporous membrane. The membrane and integrally formed support are then separated from the substrate. The membrane is dried by gentle heating.

The processes of the invention generally result in substantially complete bonding and membrane formation within about 40-70 seconds from initial immersion time depending upon the thickness of the membrane. The time required is a function of the speed of the moving substrate and the size of the formation bath, factors which can be easily regulated using conventional procedures. Formation time is also related to the thickness of the membrane as formed. The temperature of the formation bath is generally between about room temperature and about 50° C., although in certain embodiments of the invention, the formation bath temperature can be at or below zero degrees centigrade. By carefully selecting the temperature of initial polymer dissolution and the temperature and co-solvent concentration of the formation bath, a wide variety of microporous PVDF membranes can be predictably and consistently produced having properties not found in conventional PVDF membranes.

The PVDF support is preferably pre-annealed prior to incorporation into the formation bath. This ensures that any shrinkage of the PVDF support will occur before the membrane and associated support is heated during the latter parts of the production step. The annealing temperature ranges from about 120° C. to about 160° C. and a particularly preferred annealing temperature is about 145° C. for two hours.

The supported PVDF membranes of the present invention have increased tensile and elongation strength as compared to unsupported PVDF microporous membranes. Compared to PVDF membranes that are internally supported by nonwoven polyester (PVDF/polyester), membranes of the present invention show more uniform patterns of elongation and tensile strength. Consistent and reproducible formation of membranes with a given tensile strength is important in terms of quality control. A supported PVDF membrane, produced according to the present invention (see Example 1) was subjected to tensile and elongation tests. The tensile and elongation tests were performed using an Instron Model 1101 (Instron Corp.). The results are given in Table II which shows the tensile strength (lbs.) and elongation (inches) measured at the point of membrane breakage. "No brk" means no breakage.

TABLE II

Comparative tensile and elongation tests on PVDF/Polyester, Supported PVDF, and Unsupported PVDF.

| | TENSILE (LBS.) | | ELONGATION (IN.) | |
|---|---|---|---|---|
| | Cross Web | Long Web | Cross Web | Long Web |
| Supported PVDF | 10.22 | 9.875 | 1.01 | .61 |
| | 10.23 | 10.23 | .94 | .55 |
| | 10.23 | 10.23 | .67 | .55 |
| | 10.10 | 10.23 | .63 | .58 |
| | 10.23 | 10.23 | .77 | .61 |
| | 10.23 | 10.23 | .72 | .56 |
| PVDF/ Polyester | 8.012 | no brk | .87 | no brk |
| | no brk | 10.23 | no brk | .57 |
| | 8.902 | 8.282 | .82 | .52 |
| | 4.347 | no brk | .98 | no brk |

TABLE II-continued

Comparative tensile and elongation tests on
PVDF/Polyester, Supported PVDF, and Unsupported PVDF.

| | TENSILE (LBS.) | | ELONGATION (IN.) | |
|---|---|---|---|---|
| | Cross Web | Long Web | Cross Web | Long Web |
| | no brk | 3.692 | no brk | .73 |
| | no brk | 8.102 | no brk | .84 |
| Unsupported | 4.635 | 4.877 | .54 | .61 |
| PVDF | 4.555 | 4.912 | .42 | .50 |
| | 4.695 | 4.702 | .55 | .42 |
| | 4.582 | 4.927 | .56 | .47 |
| | 4.372 | 4.955 | .42 | .54 |
| | 4.292 | 4.670 | .33 | .40 |

The invention will now be further described by the following example.

EXAMPLE 1: Production of Supported PVDF Microporous Membrane

A filamentous grid of PVDF having a fiber thickness of 5 mils and a weave pattern of 70×70 was placed on the substrate of a conventional continuous solvent-casting membrane formation apparatus, as described in "PVDF Membrane", co-pending application Ser. No. 07/879,200. The initial solution contained PVDF polymer powder (18.5% solids) (Kynar ® 761 mfg. by Atochem North America, Philadelphia, Pa.) in a solution of 81.5% dimethylacetamide at 35° C. The formation bath contained 100% methanol at 22° C.

A thin film of polymer was laid down on a continuous substrate belt using a coating gap of 13 mils. Formation of the membrane was performed using the continuous belt at a speed of 5 feet per minute.

After the microporous membrane formed around the grid, the remaining solvent and nonsolvent were extracted in an extraction apparatus water at 23° C. at a water rinse rate of about 0.5 gallons per minute.

UTILITY

The microporous PVDF membrane that is cast with a PVDF support can be used in a wide variety of applications. Because the components of the membrane are made of a single material, the ability of the membrane to be folded and pleated is much improved over conventional membranes that have a support made of a completely different material. Thus, the membranes of the present invention can be used to great advantage in pleated or cartridge-like filters. Moreover, the thermal properties of both the support and microporous membrane are identical and delamination will not occur under normal circumstances. Thus, the membranes of the present invention can be used in processes that include a wide temperature range without substantially affecting the structural properties of the membrane.

EQUIVALENTS

It should be understood however that the foregoing description of the invention is intended merely to be illustrative thereof, that the illustrative embodiments are presented by way of example only, and that other modifications, embodiments, and equivalents may be apparent to those skilled in the art without departing from its spirit.

Having thus described the invention, what we desire to claim and secure by Letters Patent is:

1. A microporous membrane having opposed surfaces and a pore size, said membrane including a polymer and a support including said polymer, wherein at least a part of said support is embedded in, and bonded to, said membrane and wherein the polymer of the membrane and support comprise a homopolymer of vinylidene fluoride.

2. The membrane of claim 1, wherein the support is bonded to the membrane between opposed surfaces of said membrane.

3. The membrane of claims 1 or 2, wherein said microporous polyvinylidene fluoride membrane has a microstructure defined by a plurality of globular bodies attached to one another.

4. The membrane of claim 3 wherein at least one of said opposed surfaces has a macrostructure defined by a plurality of spheroidal craters with an average diameter substantially greater than the pore size.

5. The membrane of claim 3 wherein said membrane between said opposed surfaces has a microstructure defined by a plurality of globular bodies attached to one another.

6. The membrane of claim 5, wherein said membrane between said opposed surfaces has a macrostructure defined by a plurality of spheroidal craters with an average diameter substantially greater than the pore size.

7. The membrane of claim 1, wherein said support comprises a grid of filaments.

8. The membrane of claim 7, wherein said grid has a mesh size between about 40×40 to about 60×40 filaments per inch.

9. The membrane of claim 7, wherein a part of said filaments are exposed above at least one surface of said membrane.

10. The membrane of claim 9, wherein said filaments have a thickness of between about 2 to 5 mil.

11. The membrane of claim 10, wherein if said filaments are about 2 mil thick, then about 50% of the filament thickness is exposed.

12. The membrane of claim 10, wherein if said filaments are about 5 mil thick, then about 25% of the filament thickness is exposed.

13. The membrane of claim 9, wherein said filaments are exposed above said at least one surface and define a plurality of mesh openings on said at least one surface.

14. The membrane of claim 1, wherein a part of said support is exposed above at least one surface of said membrane.

15. The supported membrane of claim 1, having a pore size ranging from about 0.02 microns to about 2.0 microns.

16. A microporous polymeric membrane including a polymeric support, said support and membrane including the same polymer, the polymer of said support bonded to the polymer of said microporous membrane, wherein a part of said support is exposed above a surface of said membrane.

17. The polymeric membrane of claim 16, wherein said support and membrane comprises a homopolymer of vinylidene fluoride.

18. The membrane of claim 16, having a pore size ranging from about 0.02 microns to about 2.0 microns.

19. A single microporous polymeric membrane comprising a support including a polymer, wherein said support is embedded in and bonded to said single microporous membrane, and wherein part of said support is exposed above at least one surface of said single microporous membrane.

20. A microporous membrane having a pore size, said membrane including a polymer and a support, wherein at least part of said support is embedded in said membrane, said membrane having at least one surface comprising a macrostructure defined by a plurality of spheroidal craters with an average diameter substantially greater than the pore size.

21. The membrane of claim 20, wherein said polymer is arranged as a matrix forming intercommunicating pore channels, said matrix characterized as a plurality of interconnected globular bodies.

22. The membrane of claim 20, wherein said polymer and support comprise polyvinylidene fluoride.

23. The membrane of claim 20, having a pore size ranging from 0.02 microns to about 2.0 microns.

24. The membrane of claim 20, having a water flow rate between about 0.5 and 190 ml/min/cm$^2$.

* * * * *